E. RUUD.

STORAGE WATER HEATER.

APPLICATION FILED MAY 12, 1921.

Reissued June 28, 1921. 15,136.

Inventor
Edwin Ruud

By Manus, Cameron, Lewis & Kerkam
Attorneys

UNITED STATES PATENT OFFICE.

EDWIN RUUD, OF PITTSBURGH, PENNSYLVANIA, ASSIGNOR TO RUUD MANUFACTURING COMPANY, OF CAMDEN, NEW JERSEY, A CORPORATION OF NEW JERSEY.

STORAGE WATER-HEATER.

15,136. Specification of Reissued Letters Patent. Reissued June 28, 1921.

Original No. 853,738, dated May 14, 1907, Serial No. 266,909, filed June 26, 1905. Application for reissue filed May 12, 1921. Serial No. 468,945.

*To all whom it may concern:*

Be it known that I, EDWIN RUUD, a citizen of the United States of America, and a resident of Pittsburgh, Pennsylvania, have invented a new and useful Improvement in Storage Water-Heaters, which invention is fully set forth in the following specification.

My invention relates to water heaters of the storage type, in which the heated water is supplied to a storage reservoir and held therein for delivery as desired.

The object of my invention is to provide means whereby the loss of heat due to the draft of the chimney when the heater is not required to be in operation, shall be effectively eliminated.

In all automatic storage water heaters known in the art prior to my invention, so far as my knowledge and information extend, a predetermined temperature has been maintained in the heating coil or boiler, independent of that of the volume of water which may be contained in the reservoir with which the heating appliance proper is connected. The air drawn through the casing of the heater, which passes up the chimney, absorbs a certain amount of heat, and this heat loss is, under my invention, minimized.

My invention, generally stated, consists in the combination, with a heating appliance and a hot water storage reservoir, of a thermostatic regulator connected with the storage reservoir, and a valve operated thereby and adapted to instantly fully open, or completely close, as the case may be, the supply of gas to the heater, the operation of said regulator and valve being such as to provide a full flow of gas which works the heater at its maximum capacity in heating water, until the storage reservoir is filled with hot water, whereupon the supply of gas to the heating surfaces is automatically and entirely cut off, except as to a small pilot light which does not exert any substantial heating action. The heating appliance being located at a lower level than the storage reservoir, the circulation of water promptly ceases, by reason of the fact that the coldest water is the heaviest and remains quiescent in the heating appliance, so that the air which passes up the chimney comes in contact merely with cold surfaces in the heating appliance.

The improvement claimed is hereinafter fully set forth.

In the accompanying drawings:—

Figure 1:
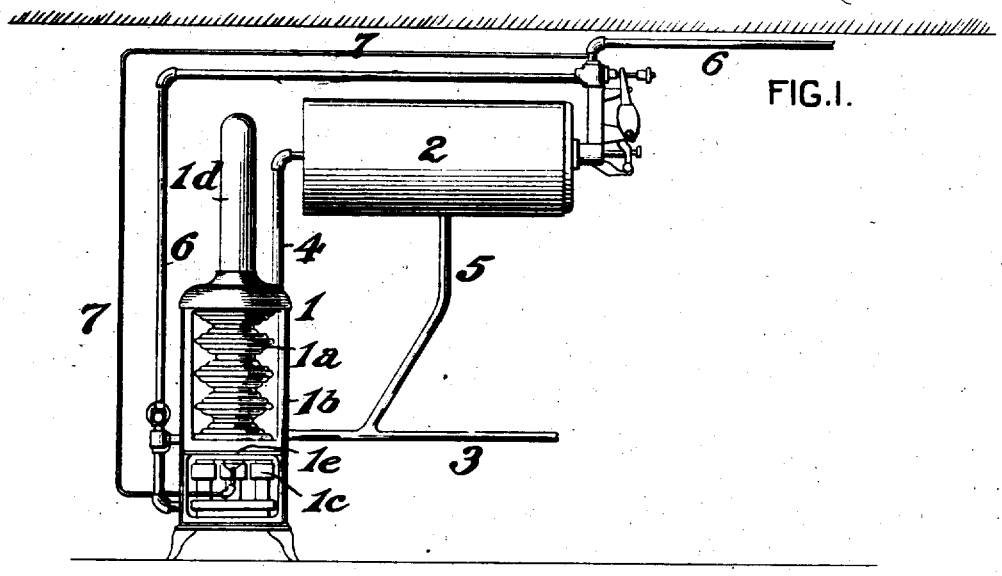
Figure 2:
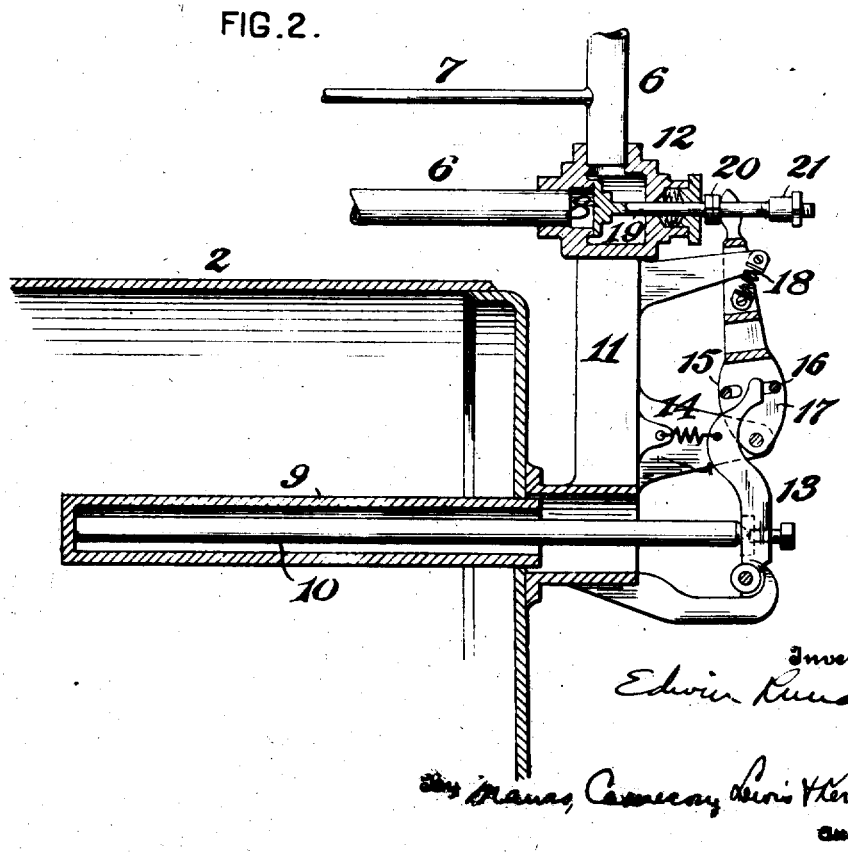

Figure 1 is a view, partly in elevation and partly in section, of a storage water heater system, illustrating an application of my invention; and Fig. 2, a sectional view, on an enlarged scale, of the thermostatic regulator, controlling valve, and operating mechanism.

My invention is herein exemplified as applied in a storage water heater system comprising a water heater, 1, a hot water storage tank or reservoir, 2, water supply and connection pipes, 3, 4, and 5, and gas supply pipes, 6 and 7, all of which are of substantially the ordinary construction and arrangement. The heating appliance proper consists of a coil, $1^a$, located in a casing or jacket, $1^b$, and heated by burners, $1^c$, to which gas is supplied by the pipe, 6, the products of combustion being carried off through an exit flue or stack, $1^d$. A small pilot burner, $1^e$, which is supplied with gas by the pipe, 7, is kept constantly lighted, for the purpose of igniting gas at the main burners, $1^c$, as from time to time required. Water is supplied to the heating coil by the pipe, 3, and circulated through the coil and storage reservoir by the pipes 4 and 5 in the usual manner.

In the practice of my invention, I provide, in connection with the storage tank, 2, a suitable thermostatic regulator, and connect it, through operating mechanism presently to be described, with a controlling valve, 8, by means of which the supply of gas is fully opened to, or entirely cut off from the burners for the hot water storage tank, accordingly as the circumstances of use may require the heating appliance to be operative or to be inoperative without waste of heat, as the case may be. In the instance shown, the thermostatic regulator consists of a metal tube, 9, which is inserted in the hot water storage tank, 2, and a rod, 10, of metal having a lesser degree of expansibility than the tube, 9, said rod being inserted in and projecting outwardly from the tube, through an opening in a supporting frame, 11, fixed to the reservoir, 2. The controlling valve, 8, is fitted to seat in a valve chamber or casing, 12, interposed between adjoining sections of the gas supply pipe, 6, and supported on the frame, 11, and is actuated by the thermostatic regulator through intermediate operating lever mechanism which i of the following construction.

The outer end of the rod, 10, abuts against a lever, 13, which is pivoted to a bracket on the frame, 11, and is maintained in contact with the rod by a spring, 14, so that the lever, 13, shall be moved outwardly by the rod, 10, and inwardly by the spring 14. The free end of the lever, 13, is movable to abut against one or the other of two pins, 15, 16, fixed upon a lever, 17, which is pivoted to a bracket on the frame, 11, above the lever, 13, and is coupled, by a spring, 18, to a bracket on the frame, the spring being inclined relatively to the lever, so as to act with leverage on the lever, 17, and throw it, when moved by the lever, 13, to the extremities of its admitted pivotal traverse. The free end of the lever, 17, is forked to embrace the stem, 19, of the controlling valve, and traverses between stops 20 and 21, which are in the form of nuts adjustable on screw threads on said stem.

In the operation of a storage water heater system in which my invention is applied, when the temperature in the hot water storage reservoir, 2, begins to fall, the pipe, 9, of the thermostatic regulator, contracts and moves the lever, 13, outwardly. In its outward traverse, the lever, 13, abuts against the pin, 16, of the lever, 17, and in turn moves said lever, 17, outwardly, until its center line passes the fulcrum of the spring, 18, which thereupon throws it to the outer extremity of its traverse, in which movement it abuts on the outer stop, 21, on the stem of the controlling valve, 8, and opens said valve to its full extent. Gas is thereby admitted, through the full capacity of the pipe 6, to the main burners, 1[c], of the heating appliance, which are ignited by the pilot burner, 1[e], and the heating of the water commences and is continued until the storage reservoir has been filled with hot water down to or below the level of the thermostatic regulator. When the water in the reservoir has reached the predetermined temperature, the tube, 9, of the thermostatic regulator expands, the lever, 13, is moved inwardly by the spring, 14, and, acting on the pin, 15, of the lever, 17, moves said lever inwardly. When the lever, 17, passes the fulcrum of the spring, 18, said spring throws the lever to the inner extremity of its traverse, in which movement it abuts on the inner stop, 20, on the stem of the controlling valve, and instantly seats said valve, thereby completely cutting off the supply of gas to the main burners. The heating appliance then remains entirely inactive until the heat of the water in the storage reservoir has been sufficiently reduced by drawing water therefrom or by radiation, whereupon the operation as above described will be automatically repeated.

It will thus be seen that, by the application of my invention, the heat losses inherent in the ordinary storage water systems are completely eliminated, and the economy thus effected renders practicable the utilization of illuminating gas as a heating medium. This, prior to my invention has been found too expensive by reason of the former waste of gas when constant combustion at the main burners is maintained. A further advantage is attained in the prevention of flashing, by reason of the gas being immediately fully turned onto the burners whenever the heating appliance is required to operate.

It will be obvious that my invention is not limited to an intermittently operating mechanism or device which acts directly to fully open and completely close a gas controlling valve in and by the movements of a thermostatic regulator under variations of storage reservoir temperature, inasmuch as the same result may be attained by the intermediation of an additional device or devices between said operating mechanism and valve, without departure from the spirit and operative principle of my invention.

I claim as my invention and desire to secure by Letters Patent:

1. In a storage water heater system, the combination of a water-heater, a reservoir, connections between the same, a valve to control the supply of fuel to said heater, a thermostat in said reservoir, a lost-motion connection between said thermostat and valve and means to cause said valve to remain either entirely closed or completely open.

2. In a storage water heater system, the combination of a water-heating receptacle, a heater therefor, a hot-water-storage reservoir located above said receptacle, pipes connecting the same, a valve to admit fuel to said heater, a thermostat in said reservoir, a lever arranged to be actuated by said thermostat, a second lever having a lost-motion connection with said first lever and a lost-motion connection with said valve and a spring tending to hold said second lever in either one of its extreme positions.

3. In a storage water heater system, the combination with a heater, a reservoir and pipes connecting the same, of a valve to control the supply of fuel to said heater, a thermostat arranged in position to be affected by changes in temperature of the water in said reservoir, a lever mounted in position to be moved by said thermostat, a second lever adapted and arranged to be engaged and moved by said first lever in certain points in the path of movement of the latter, a spring tending to hold said second lever in either of its extreme positions and a lost-motion connection between said second lever and said valve.

4. In a storage water heater system, the combination of a heater, a reservoir located above said heater and connected thereto by pipes, a valve to control the supply of fuel to said heater, a thermostat in said reservoir, a lever having a lost motion connection with said valve, a spring tending to hold said lever in either of its extreme positions and means including a lost-motion connection whereby said lever is actuated by said thermostat when the water in said reservoir reaches predetermined limits of temperature.

In testimony whereof I have signed this specification.

EDWIN RIEID.